United States Patent
Rahman et al.

(10) Patent No.: US 7,827,360 B2
(45) Date of Patent: Nov. 2, 2010

(54) CACHE LOCKING DEVICE AND METHODS THEREOF

(75) Inventors: Syed R. Rahman, Austin, TX (US);
David F. Greenberg, Austin, TX (US);
Kathryn C. Stacer, Round Rock, TX (US);
Klas M. Bruce, Leander, TX (US);
Matt B. Smittle, Allen, TX (US);
Michael D. Snyder, Austin, TX (US);
Gary L. Whisenhunt, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 562 days.

(21) Appl. No.: 11/832,797

(22) Filed: Aug. 2, 2007

(65) Prior Publication Data

US 2009/0037666 A1 Feb. 5, 2009

(51) Int. Cl.
*G06F 12/00* (2006.01)
(52) U.S. Cl. .................. 711/141; 711/143; 711/144; 711/163
(58) Field of Classification Search ............... 711/141, 711/143–144, 152, 163
See application file for complete search history.

(56) References Cited

U.S. PATENT DOCUMENTS 4,513,367 A 4/1985 Chan et al.
5,493,667 A 2/1996 Huck et al.
5,694,567 A 12/1997 Bourekas et al.
5,822,764 A 10/1998 Hardage et al.
6,044,478 A 3/2000 Green
6,438,655 B1 8/2002 Nicol et al.
6,490,654 B2 * 12/2002 Wickeraad et al. .......... 711/133
6,629,209 B1 9/2003 Arimilli et al.

FOREIGN PATENT DOCUMENTS

EP 0 568 221 A1 11/1993

OTHER PUBLICATIONS

International Search Report for corresponding PCT Application No. PCT/US2008/067225, mailed Feb. 19, 2009.

* cited by examiner

*Primary Examiner*—Jasmine Song

(57) ABSTRACT

A method and device for locking a cache line of a cache is disclosed. The method includes automatically changing a state of a cache line from a valid locked state to an invalid locked state in response to receiving an indication that a memory location external to the cache and corresponding to the cache line is associated with an access request by a processor or other data access module. Thus, the locked state of a cache line is maintained even after data in the locked cache line is invalidated. By maintaining the invalid locked state, the cache line is not available for reallocation by the cache. This allows locked cache lines that become invalidated to remain locked without additional software overhead to periodically determine whether the lock has been lost due to invalidation of the cache line.

20 Claims, 6 Drawing Sheets

| STATUS BITS | | | | VALID/UNLOCKED | VALID/LOCKED | INVALID/UNLOCKED | INVALID/LOCKED |
|---|---|---|---|---|---|---|---|
| V | M | S | L | | STATUS STATES | | |
| 1 | 1 | 1 | 0 | X | | | |
| 1 | 1 | 0 | 0 | X | | | |
| 1 | 0 | 1 | 0 | X | | | |
| 1 | 0 | 0 | 0 | X | | | |
| 1 | 1 | 1 | 1 | | X | | |
| 1 | 1 | 0 | 1 | | X | | |
| 1 | 0 | 1 | 1 | | X | | |
| 1 | 0 | 0 | 1 | | X | | |
| 0 | 1 | 1 | 0 | | | X | |
| 0 | 1 | 0 | 0 | | | X | |
| 0 | 0 | 1 | 0 | | | X | |
| 0 | 0 | 0 | 0 | | | X | |
| 0 | 1 | 1 | 1 | | | | X |
| 0 | 1 | 0 | 1 | | | | X |
| 0 | 0 | 1 | 1 | | | | X |
| 0 | 0 | 0 | 1 | | | | X |

400

| STATUS BITS | | | | STATUS STATES | | | |
|---|---|---|---|---|---|---|---|
| V | M | S | L | VALID/UNLOCKED | VALID/LOCKED | INVALID/UNLOCKED | INVALID/LOCKED |
| 1 | 1 | 1 | 0 | X | | | |
| 1 | 1 | 0 | 0 | X | | | |
| 1 | 0 | 1 | 0 | X | | | |
| 1 | 0 | 0 | 0 | X | | | |
| 1 | 1 | 1 | 1 | | X | | |
| 1 | 1 | 0 | 1 | | X | | |
| 1 | 0 | 1 | 1 | | X | | |
| 1 | 0 | 0 | 1 | | X | | |
| 0 | 1 | 1 | 0 | | | X | |
| 0 | 1 | 0 | 0 | | | X | |
| 0 | 0 | 1 | 0 | | | X | |
| 0 | 0 | 0 | 0 | | | X | |
| 0 | 1 | 1 | 1 | | | | X |
| 0 | 1 | 0 | 1 | | | | X |
| 0 | 0 | 1 | 1 | | | | X |
| 0 | 0 | 0 | 1 | | | | X |

*FIG. 4*

CACHE LOCKING DEVICE AND METHODS THEREOF

FIELD OF THE DISCLOSURE

The present disclosure relates to processing devices and more particularly to caches for processing devices.

BACKGROUND

Processing devices sometimes employ one or more caches to provide a temporary, rapid access storage location for a processor. In response to a store instruction being executed at the processor, a cache determines whether a cache line of the cache is already associated with the store address. In the case of a cache hit, the cache stores the data at the cache line associated with the store address. If there is no cache line associated with the store address containing valid data a cache miss occurs. In the event of a cache miss, the cache determines a cache line to store the store data by identifying the least recently used (LRU) cache line of the cache. Data stored at the LRU cache line is replaced with the data being stored and a tag of the cache line is associated with the store address. In order to preserve a cache line for critical data, a software program or routine at the processor can instruct the cache to lock a cache line, thereby forcing the cache line to be associated with a specific memory address to ensure that the locked cache line will not be replaced in the cache by data associated with another memory address.

In addition to storing data, a cache can store coherency status information for each cache line in order to maintain coherency of the data in the cache with external memory and other caches of the processing system. For example, a valid bit associated with a cache line can be invalidated in response to receiving an indication that the memory address associated with the cache line has been requested for access at a memory location external to the cache. In response to an external memory access to a memory address associated with a cache line, current processing devices will automatically place the cache line in an unlocked state, thereby allowing the cache line to be allocated to store data from any address. Accordingly, in order to maintain the locked state of a cache line that is invalidated, a software program or routine must monitor a locked cache line and relock the cache line when it is invalidated. This increases the size of the software program and reduces its efficiency. Accordingly, there is a need for a new processing device.

BRIEF DESCRIPTION OF THE DRAWINGS

FIG. 4 is a diagram of a particular embodiment of possible states for the cache of FIG. 1;

DETAILED DESCRIPTION

A method and device for locking a cache line of a cache is disclosed. The method includes automatically changing a state of a cache line from a valid locked state to an invalid locked state in response to receiving an indication that a memory location external to the cache and corresponding to the cache line is associated with an access request by a processor or other data access module. Thus, the locked state of a cache line is maintained even after data in the locked cache line is invalidated. By maintaining the invalid locked state, the cache line is not available for reallocation by the cache. This allows locked cache lines that become invalidated to remain locked without additional software overhead to periodically determine whether the lock has been lost due to invalidation of the cache line.

Figure 1:
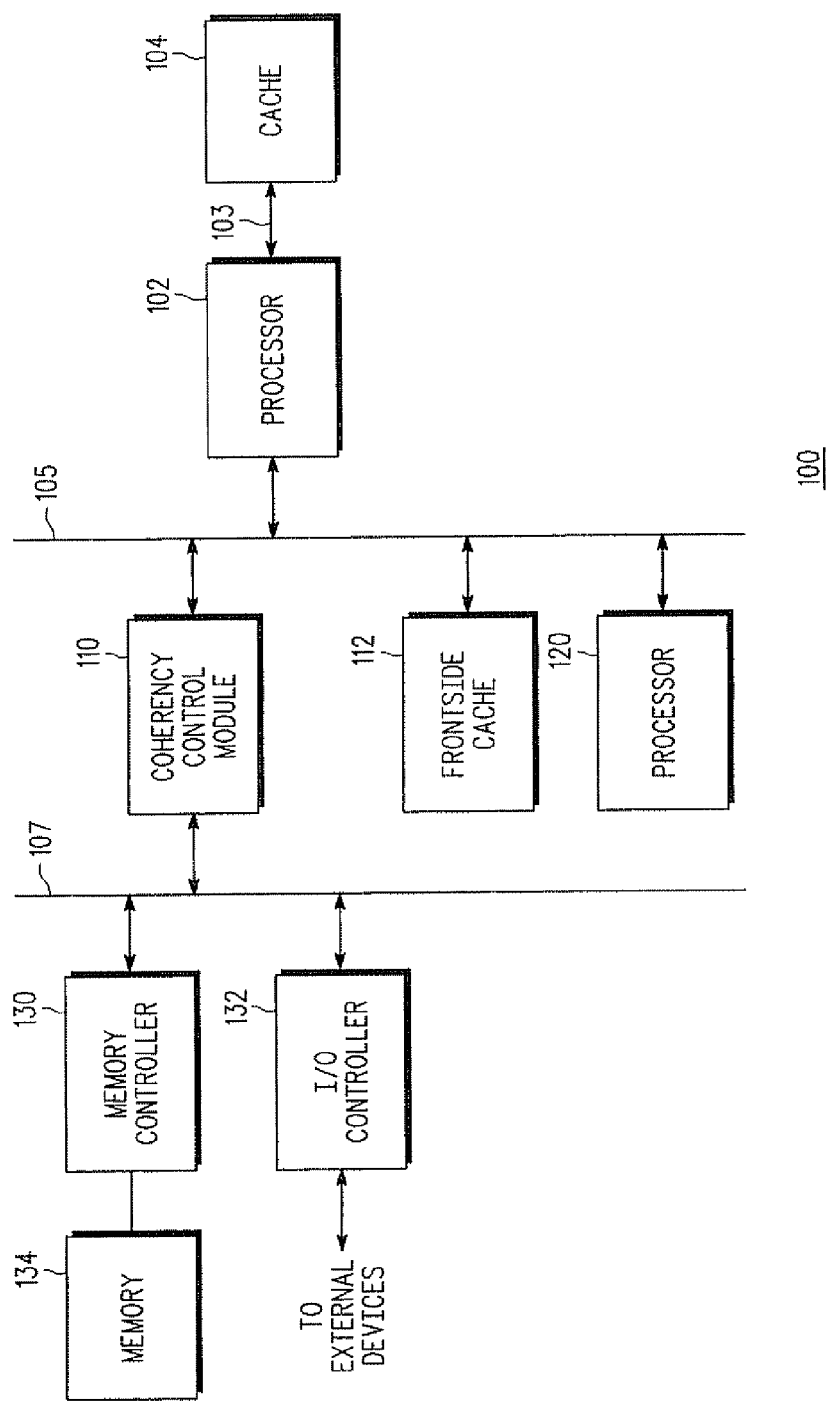
FIG. 1 is a block diagram of particular embodiment of a processing device 100.

Referring to FIG. 1, a particular embodiment of a device 100 is illustrated. The device 100 includes a processor 102, a cache 104, a coherency control module 110, a frontside cache 112, a processor 120, a memory controller 130, an I/O controller 132, and memory 134. The device 100 also includes a bus 103, a frontside bus 105, and an I/O bus 107. The processor 102 accesses the cache 104 through the bus 103. The processor 102, the coherency control module 110, and the processor 120 are connected to each other through the frontside bus 105. The coherency control module 110, the memory controller 130, and the I/O controller 132 are connected to each other through the I/O bus 107. The memory controller 130 is connected to the memory 134. It will be appreciated that other configurations of the modules illustrated in FIG. 1 are possible. For example, in a particular embodiment, all of the modules are connected to a common bus or cross-bar switch.

The processor 102 can be a processor, such as a microprocessor, microcontroller, and the like. Similarly, the processor 120 can be a processor, such as a microprocessor, controller, microcontroller, and the like.

The cache 104 can be a data cache, an instruction cache, a unitary cache, and the like. In a particular embodiment, the cache 104 is an 8-way set associative cache. The cache 104 is accessed via the bus 103, and stores data associated with instructions executed at the processor 102.

The cache 104 includes a number of cache lines, with each valid cache line being associated with a memory address. In addition, the cache 104 maintains state information for each cache line, including coherency state information. For example, for each cache line the cache 104 indicates whether the data stored at the cache line is valid, whether it is shared data, whether the data has been modified by the processor 102, and the like. The state information also indicates the locked status for each cache line to indicate whether a cache line can be associated with a different memory address. In a particular embodiment, the cache 104 is a write-back cache. In another particular embodiment, the cache 104 is a write-through cache.

The memory controller 130 receives memory access requests via the I/O bus and accesses memory, including the memory 134, the frontside cache 112, or external memory accesses via the I/O controller 132, based on those memory requests. In a particular embodiment, the memory 134 accessed by the memory controller 130 is integrated on a common substrate, such as a packaging substrate or common integrated circuit substrate with other elements illustrated in FIG. 1. Memory 134 can be volatile or non-volatile memory.

The I/O controller 132 is configured to facilitate communications between modules of the device 100 and with external peripheral devices (not shown). For example, the I/O controller 132 can allow the memory controller 130 to access peripheral memory devices. Accordingly, the I/O controller manages communication of information between the peripheral devices, including memory, and modules of the device 100.

The frontside cache 112 can be a data cache, an instruction cache, a unitary cache, and the like. The frontside cache 112 is accessible to modules of the device 100 having access to the frontside bus 105, such as the processor 102 and the processor 120.

The coherency control module 110 receives coherency information from the frontside bus 105 and the I/O bus 107 and provides coherency control information based on the received coherency information to modules of the device 100 to ensure that data coherency is maintained.

During operation, the processor 102 and the processor 120 can each access the memory 134 and the cache 112. For example, the processor 102 can read a location of the memory 134 by sending a memory address to the memory controller 130. In response, the memory controller 130 retrieves data associated with the memory address from the memory 134. In a particular embodiment, the memory controller 130 retrieves sufficient data to fill a cache line of the cache 104 and provides the data to the processor 102. The processor 102 receives the retrieved data and stores it in a cache line of the cache 104. In addition, the cache 104 stores tag information associated with the memory address that indicates the retrieved cache line is associated with the memory address of the memory 134 from which the data was retrieved. The processor 120 and the processor 102 can similarly access the memory 134 and store retrieved data at the frontside cache 112.

The coherency control module 110 receives information regarding accesses to the memory 134, the frontside cache 112, the cache 104, and any other memories of the device 100, and provides coherency information to the frontside cache 112, the cache 104, and other memories to maintain data coherency. For example, if a memory address associated with a cache line of the cache 104 is accessed at the memory 134 by an external processor or other device, the coherency control module 110 notifies the cache 104 of the memory access.

To notify the cache 104 of a memory access associated with a memory address, the coherency 110 can provide coherency control information to the cache 104 via the processor 102. Based upon this information, the state of the coherency information for a cache line of the cache 104 associated with the memory address can be maintained. For example, in response to coherency control information indicating that a memory address has been requested for access, the cache 104 can change the coherency state information for a cache line associated with the memory address to indicate that the data stored at the cache line is invalid.

The processor 102 can control the locked state of a cache line by executing an instruction to set the lock state of each cache line based on user instructions of a program or operating system. For example, software can issue an instruction to explicitly lock or unlock a particular cache line of the cache 104. Cache lines that are in a locked state are not available for reallocation by the cache 104 in response to a memory access at the processor 102. Accordingly, the locked cache line remains allocated to a specific address as long as it is in the locked state.

Once locked, the locked state for a cache line of cache 104 does not change in response to a change in the coherency status of the cache line initiated by the coherency control module 110. Instead, the locked state is maintained at the cache 104 until it is explicitly changed by an instruction at the processor 102. Accordingly, if the coherency status for a locked cache line is changed from a valid state to an invalid state due to a memory access at the memory 134, the cache line remains locked. Automatically retaining the lock on a cache line is an advantage over the prior art, since a software intervention is not required to maintain the lock.

Figure 2:
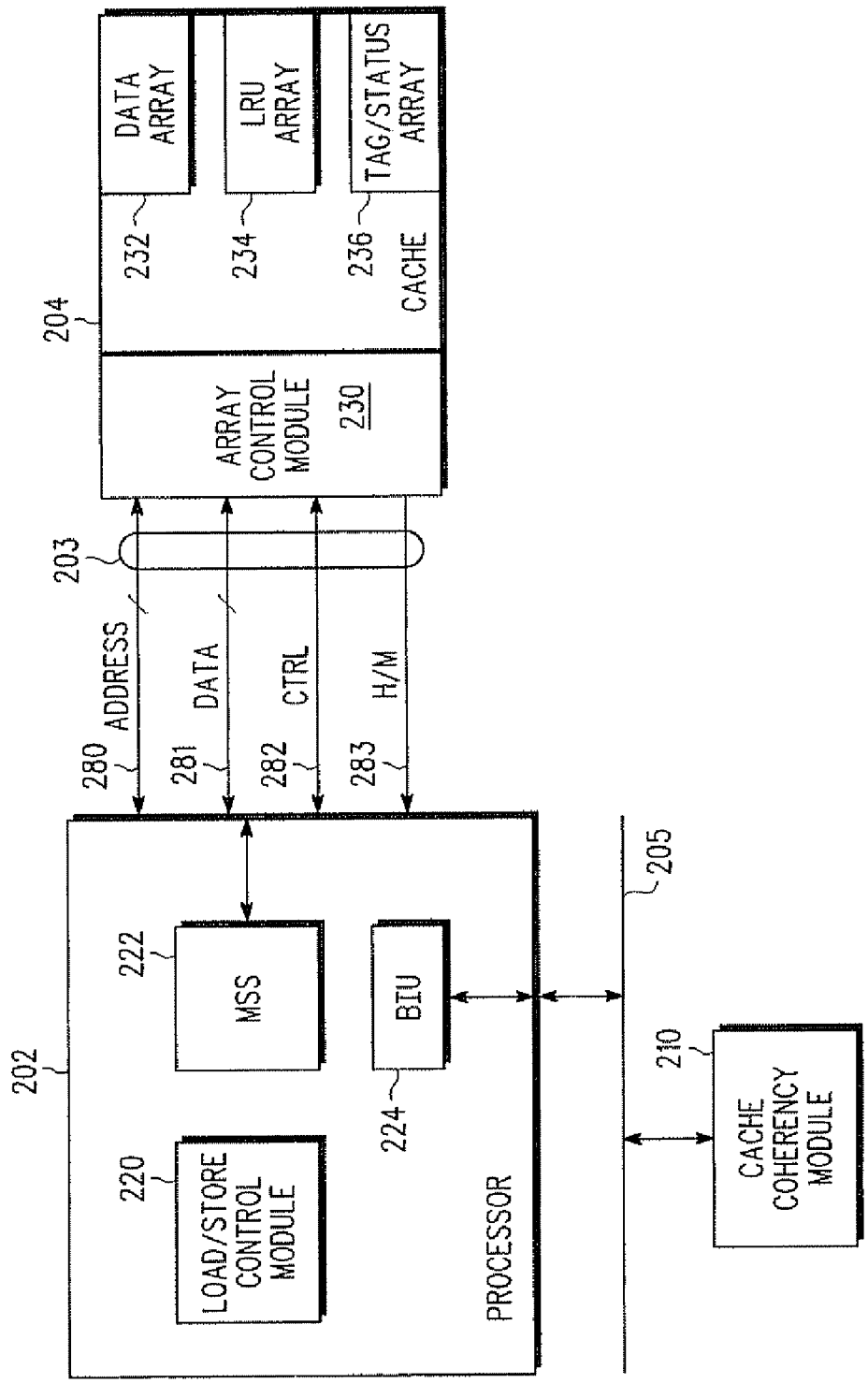
FIG. 2 is a block diagram of a particular embodiment of a portion of the processing device 100.

Referring to FIG. 2, a block diagram of a particular embodiment of a processor 202 (corresponding to the processor 102 of FIG. 1), a bus 203 (corresponding to the bus 103 of FIG. 1), a cache 204 (corresponding to the cache 104 of FIG. 1), and a cache coherency module 210 (corresponding to the cache coherency module 110 of FIG. 1), is illustrated. The processor 202 and the cache 204 are each connected to the bus 203. The cache coherency module 210 and the processor 202 are connected to a frontside bus 205, corresponding to the frontside bus 105 of FIG. 1.

The bus 203 includes an address bus 280, a data bus 281, a control bus 282 ("CTRL"), and a hit/miss bus 283 ("H/M"). The address bus 280 communicates address information between the processor 202 and the cache 204, while the data bus 281 communicates data to be loaded or stored. The control bus 282 communicates control information and the hit/miss bus 283 communicates cache hit information between the processor 202 and the cache 204.

The processor 202 includes a load/store control module 220, a memory subsystem (MSS) 222, and a bus interface unit (BIU) 224. The load/store control module 220 is connected to the memory subsystem 222, which provides an interface to bus 203 for the modules of the processor 202, while the bus interface unit 224 provides an interface to bus 205 for the modules of the processor 202.

The load/store control module 220 communicates with the memory subsystem 222 to control load and store operations for the processor 202. The memory subsystem 222 executes the load and store operations by providing control information to the CTRL bus 282 and to bus 205, as needed. The memory subsystem 222 provides and receives coherency control information to and from the cache coherency module 210 via the bus interface unit 224.

The cache 204 includes an array control module 230, a data array 232, a least recently used (LRU) array 234, and a tag/status array 236. The data array 232 includes the cache lines for the cache 204. The cache lines are stored as a plurality of cache line sets, each cache line set associated with a specific portion of a memory address referred to as an index. The LRU array 234 stores information indicating which cache lines within a cache line set is least recently used. In a particular embodiment, the LRU array 234 is implemented as a pseudo-LRU.

The tag/status array 236 stores tag information and coherency information for each cache line. The array control module 230 receives load and store control information via the CTRL bus 282. Based on the load and store control information, the array control module accesses the tag/status array 236, the LRU array 234, and the data array 232 to execute load and store operations.

During operation, the memory subsystem 222 provides status control information for the cache lines of the cache 204 via the control bus 282. The status control information can be based on coherency information received from the cache coherency module 210, or based on instructions being handled by the load/store module 220, such as load/store instructions and instructions that explicitly indicate that a location of the cache 204 should be locked. Based on the control information, the array control module 230 changes the status information for the associated cache lines in the tag/status array 236.

The load/store control module 220 interfaces with the memory subsystem 222 to execute load and store instructions provided by software programs or routines being executed at the processor 202. To execute a load instruction, the memory subsystem 222 provides an address to the cache 204 via the address bus 280. In response to receiving the address, the array control module 230 provides an index value based on the address to the tag/status array 236, which provides a set of tag values and status information associated with cache lines of a cache line set corresponding to the index. Based on the received tag and status values, the array control module 230 determines whether a cache line has been allocated to the address, and whether the cache line stores valid data. If a cache line that stores valid data has been allocated to the address (i.e. a cache hit), the array control module 230 indicates the hit on the hit/miss bus 283 and retrieves the requested data from the data array 232. The retrieved data is provided to the processor 202 via the data bus 281.

If the tag/status array 236 indicates that there is no cache line in the data array 232 associated with the provided address, or if there is a cache line in the data array 232 associated with the provided address having invalid data, a cache miss has occurs relative to the load instruction. In the event of a cache miss, the array control module 230 indicates a miss on the hit/miss bus 283, notifying the memory subsystem 222 that the requested data should be retrieved from memory. In response to a cache miss, the memory subsystem 222 retrieves the requested data from elsewhere and stores it at the cache 204 by executing a store operation when the data is received.

To execute a store operation, either after retrieving data in the event of a cache miss or in response to a store instruction at the load/store control module 220, the memory subsystem provides the address associated with the data to be stored to the cache 204 via the address bus 280. The data to be stored is provided via the data bus 281. To store the data, the array control module 230 accesses the tag/status array to determine if a valid or locked cache line in the data array 232 has already been allocated to the received address. If so, the array control module 230 treats the access as causing a cache hit and stores the received data at the cache line in the data array 232 indicated by the tag/status array 236. If there is not a cache line in the data array 232 already associated with the address, the array control module 230 stores the LRU array 234 to determine a cache line in the data array 232 to store the data.

In response to execution of an instruction explicitly locking a memory address, the load/store control module 220 can indicate to the memory subsystem 222 that a cache line associated with the memory address should be locked. To lock the cache line, the memory subsystem 222 sends control information via the CTRL bus 282 and the memory address via the address bus 280. In response to receiving the memory address, the array control module 230 determines whether a cache line of the data array 232 is associated with the memory address. If so, the array control module sets the state of the status information associated with the cache line stored in the tag/status array 236 to indicate that the cache line is locked. A lock status indicator, such as a dedicated lock bit as discussed at FIG. 4, can indicate the locked state of a cache line in the tag/status array 236.

If a cache line is not associated with the memory address to be locked, the array control module 230 sends a request to the memory subsystem 222 to retrieve data associated with the memory address from a location other than the cache 204. After the data has been retrieved and stored in a cache line of the data array 232, the array control module 230 sets the state of the status information associated with the cache line to indicate that the cache line is locked.

Locked cache locations are not eligible to be identified by the LRU array 234 for association with other memory loca-tions during store operations. In addition, the locked state for a cache location is maintained in the tag/status array 236, even if the tag/status array 236 indicates that the data at the location is invalid. Accordingly, the locked cache line remains locked until it is explicitly unlocked by an instruction at the load/store control module 220.

Figure 3:
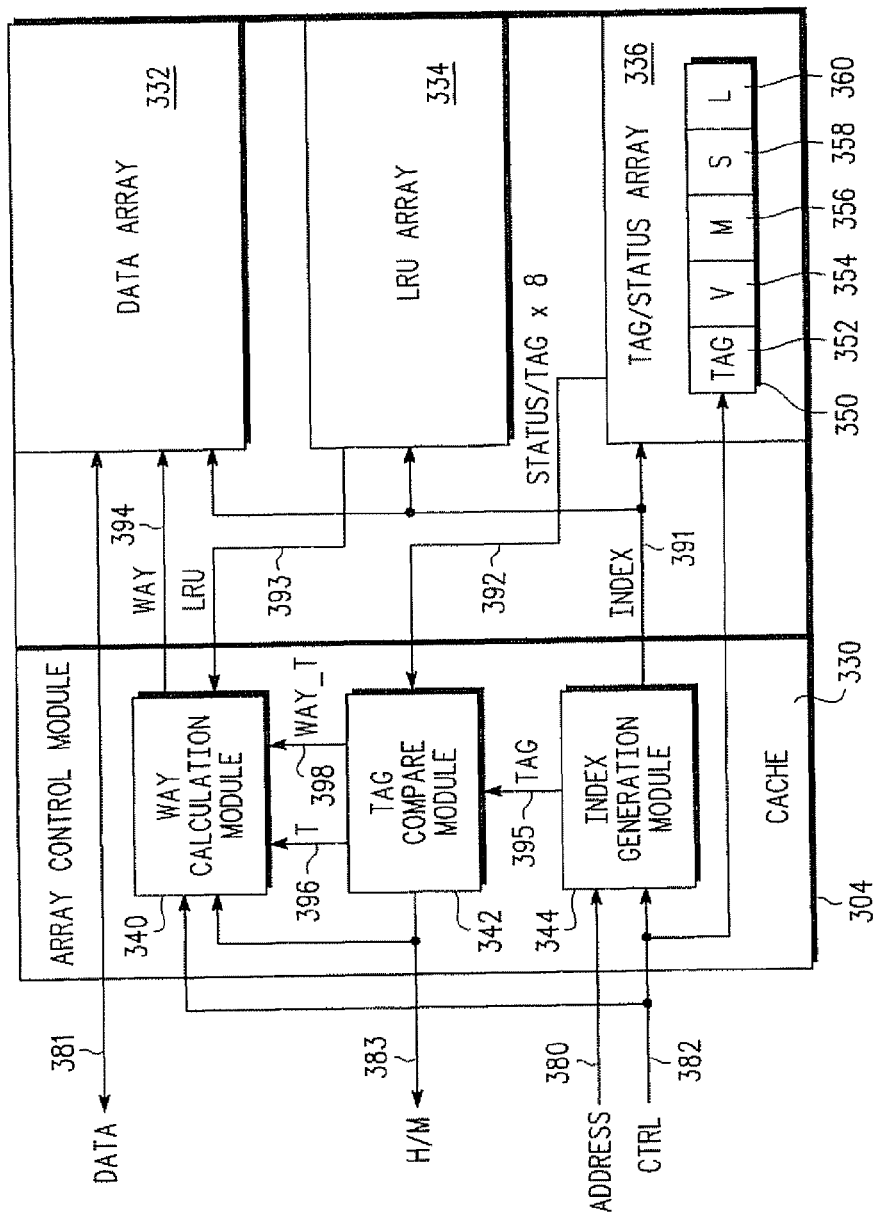
FIG. 3 is a block diagram of a particular embodiment of a cache of FIG. 1.

Referring to FIG. 3, a block diagram of a particular embodiment of a cache 304 corresponding to a specific implementation of the cache 204 of FIG. 2 is illustrated. The cache 304 includes an array control module 330, a data array 332, a least recently used (LRU) array 334, and a tag/status array 336. The array control module 330 includes a way calculation module 340, a tag compare module 342, and an index generation module 344. The way calculation module 340 includes an input connected to a hit/miss (H/M) bus 383, an input connected to a bus 396 (T), an input connected to a bus 382 (CTRL), an input connected to a bus 398 (WAY_T), and an input connected to a bus 393 (LRU). The way calculation module 340 also includes an output connected to a bus 394 (WAY).

The tag compare module 342 includes an input connected to a bus 395 (TAG) and an input connected to a bus 392 (STATUS/TAGX8). The tag compare module 342 also includes an output connected to the H/M bus 383, an output connected to the T bus 396, and an output connected to the WAY_T bus 398. The index generation module 344 includes an input connected to a bus 380 (ADDRESS) and an input connected to a bus 382 (CTRL). The index generation module 344 also includes an output connected to a bus 391 (INDEX) and an output connected to the TAG bus 395.

The data array 332 includes an input connected to the WAY bus 394 and an input connected to the INDEX bus 391. The data array 332 also includes an input/output connection to a bus 381 (DATA). The LRU array 334 includes an input connected to the INDEX bus 391 and an output connected to the LRU bus 393.

The tag/status array 336 includes an input connected to the INDEX bus 391, an input connected to the CTRL bus 382, and an output connected to the STATUS/TAGX8 bus 392. The tag/status array 336 stores tag/status information such as tag/status information 350 that represents tag information and status information for a specific cache line. The tag/status information 350 includes tag information 352, validity information 354, modified information 356, shared information 358, and locked information 360.

The status information at the tag/status array 336 can be changed by control information provided on the CTRL bus 382 based on coherency information or based on instructions executed at a processor. For example, the coherency control module 210 (FIG. 2) can indicate via the CTRL bus 382 that the status of the valid information 354 should be set to indicate that the cache line associated with the tag information 350 is invalid. Similarly, an instruction executed at the load/store control module 220 (FIG. 2) can explicitly set the status of the locked information 360 via the CTRL bus 382.

The index generation module 344 decodes an address provided on the ADDRESS bus 380. Based on the address, the index generation module 344 provides a tag on the TAG bus 395 and an index on the INDEX bus 391. The index generation module 344 also receives control information via the CTRL bus 382, including information indicating whether the received address is associated with a load or a store operation. The index generation module can provide this control information via the TAG bus 395.

The tag/status array 336 receives index information via the INDEX bus 391. Based on the index information, the tag/status array 336 provides tag information and status information for each cache line associated with the index information via the STATUS/TAGX8 bus 392. In a particular embodiment, the cache 304 is an 8-way associative cache, and therefore 8 sets of tag and status information are provided via the STATUS/TAGX8 bus 392.

The tag compare module 342 compares tag information received via the TAG bus 395 to the tag information received via the STATUS/TAGX8 bus 392 to determine if there is cache hit or a cache miss. The tag compare module 342 indicates a cache hit or cache miss via the H/M bus 383. In addition, in the event of a cache hit, the tag compare module 342 provides information indicating the cache line associated with the hit tag via the WAY_T bus 398. In addition, the tag compare module 342 determines whether the cache line associated with the cache hit is an invalid and locked cache line based on the received status information associated with the hit tag, and provides information indicating the invalid and locked status of the cache line via the T bus 396.

The LRU array 334 receives the index provided via the INDEX bus 391. Based on the received index, the LRU array 334 determines a least recently used cache line associated with that index, and indicates the cache line via the LRU bus 393. In a particular embodiment, the LRU array 334 uses a pseudo-LRU procedure to determine the least recently used cache line.

The way calculation module 340 receives information on the CTRL bus 382 indicating whether a load or store operation is being performed and information on the H/M bus 383 indicating whether the load or store operation has resulted in a cache hit or a cache miss. In the event of a cache hit, the way calculation module 340 accesses cache line information received via the WAY_T bus 398 to determine which cache line should be loaded or stored. In the event of a cache miss for a store operation, the way calculation module 340 accesses information provided via the LRU bus 393 to determine which cache line should be stored. The way calculation module 340 selects a cache line based on the hit/miss information provided by the H/M bus 383, the load/store information provided by the CTRL bus 382, and the valid-locked information provided by the T bus 396.

For example, if the received information indicates a load operation, and a cache hit, the way calculation module 340 selects the cache line information provided via the WAY_T bus 398. If the received information indicates a load operation and a cache miss, the way calculation module 340 does not select cache line information, as the requested data is not stored in the cache and must be retrieved from memory.

If the received information indicates a store operation, a cache miss, and the T bus 396 indicates that no invalid and locked cache line is associated with the received address, the way calculation module selects the cache line information provided via the LRU bus 393. If the received information indicates a store operation, a cache miss, and the T bus 396 indicates that an invalid-locked way is associated with the received address, the way calculation module 342 selects the cache line information provided via the WAY_T bus 398. If the received information indicates a cache hit, the way calculation module 342 selects the cache line information provided via the WAY_T bus 398.

The data array 332 receives cache line information via the WAY bus 394 along with information indicating whether a load or store operation is being performed. In the event of a load operation, the data array 332 provides data stored at the indicated cache line on the DATA bus 381. In the event of a store operation, the data array 332 stores data provided on the DATA bus 381 at the indicated cache line.

It will be appreciated that the status bits for a cache line can be used to determine how a cache line is to be treated by the array control module 330. For example, referring to FIG. 4, cache status bits for valid (V), modified (M) shared (S), and locked (L) are listed in columns 401-404 of table 400. As illustrated, it will be appreciated that a set of status bit values can correspond to more than one state term, as used herein. For example, a cache line having the status bit values illustrated in row 410 of table 400 can be referred to as being at a valid state, a modified state, a shared state, and an unlocked state, and combinations thereof. Similarly, a cache line having the status bit values illustrated in row 412 of table 400 can be referred to as being at an invalid state, an unmodified state, an exclusive state, and a locked state. It will therefore be appreciated that, based on a specific set of status bit states, a cache line can be referred to as being at a valid and unlocked (valid/unlocked) state, as indicated in column 405, a valid and locked (valid/locked) state, as indicated in column 406, an invalid and unlocked (invalid/unlocked) state, as indicated in column 407, or an invalid and locked state (invalid/locked), as indicated in column 408. It will be appreciated that not all states set forth in the table may be valid for all coherency schemes.

The status for a cache line can be used to determine how a cache treats the cache line. For example, if the status of a cache line is invalid and locked, as indicated in column 408, a cache can prevent that cache line from being replaced by data associated with a different memory address, thereby preserving the locked status of the cache line.

Figure 5:
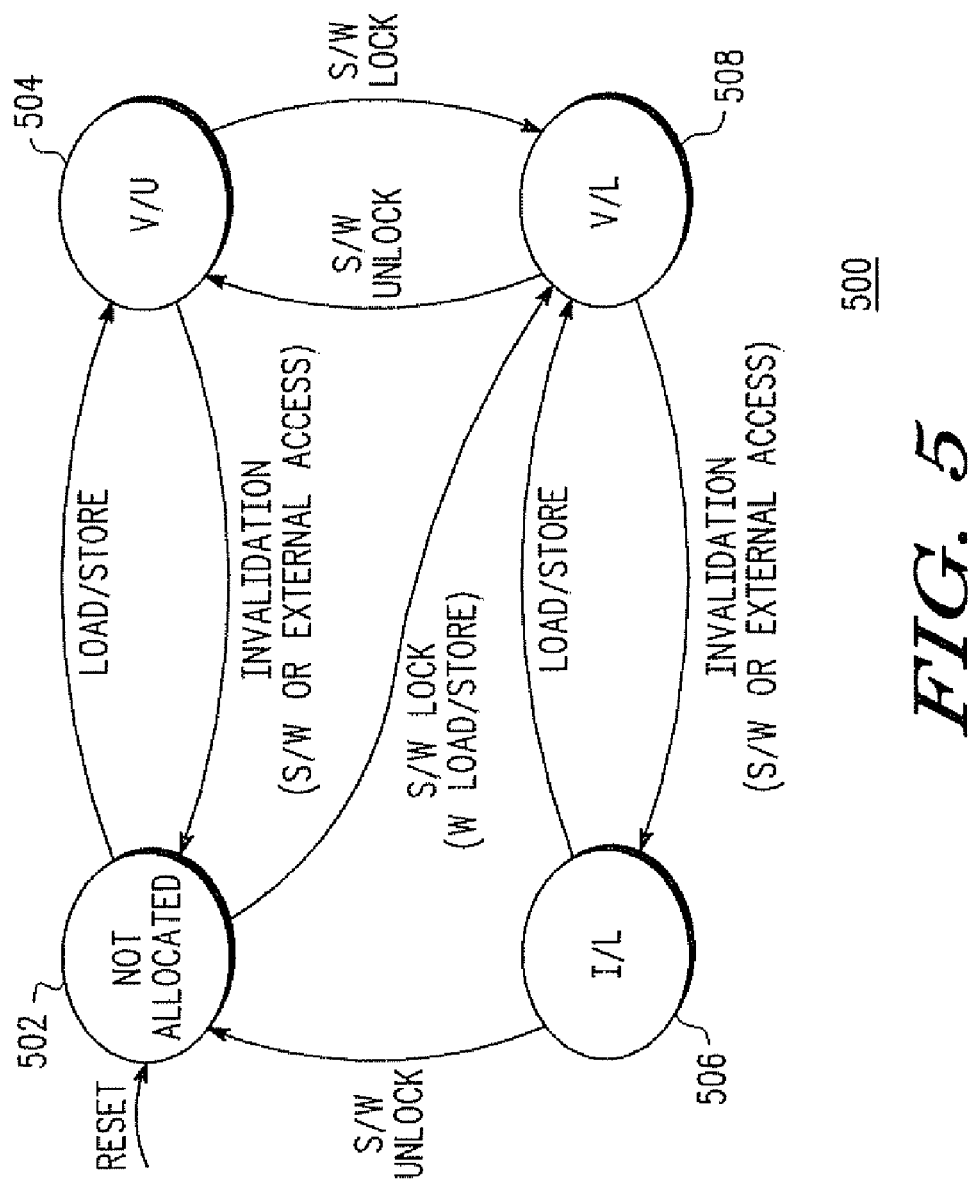
FIG. 5 is a diagram of a particular embodiment illustrating changes between possible states for a cache line of the cache of FIG. 1.

Referring to FIG. 5, a state diagram 500 depicting a particular embodiment of possible states for cache line at a cache is illustrated. The state diagram 500 illustrates four specific states for the cache line: a not allocated state 502, a valid/locked state 504, an invalid/locked state 506, and a valid/locked state 508. As illustrated, a cache line can begin in not allocated state 502, such as after a reset operation, indicating that the cache line has not been allocated to a memory address. The not allocated state can also correspond to a state where the cache line is in an invalid/unlocked state.

If, at the not allocated state 502, the cache line is allocated to a memory address by a load or store operation, the state of the cache line moves to the valid/unlocked state 504, e.g. the valid bit (V) for the cache line is asserted and the lock bit for the cache line is negated. If, at the not allocated state 502, a software lock instruction is received, the cache line is allocated to the memory address, data associated with the memory address is retrieved from memory other than the cache and stored in the cache line, and the state of the cache line is set to the valid/locked state 508, e.g. the valid bit (V) and the lock bit (L) for the cache line are both asserted. In an alternative embodiment (not shown), data is not retrieved in response to the software lock, and the state of the cache line is set to the invalid/locked state 506, e.g. the valid bit (V) for the cache line is negated and the lock bit (L) for the cache line is asserted.

At the valid/unlocked state 504, if an invalidation indication is received, such as due to access of the data associated with the memory address by an external module, or by an invalidating software instruction, the state of the cache line is set to the invalid/unlocked state 502, e.g. the valid bit (V) for the cache line is negated. If, at the valid/unlocked state 504, a software lock instruction is received, the state of the cache line is set to the valid/locked state 508, e.g. the lock bit (L) for the cache line is asserted.

If, at the valid/locked state 508, a software instruction unlocking the memory address is received the state of the cache line is set to the valid/unlocked state 504, e.g. the lock bit (L) for the cache line is negated. If, at the valid/locked state 508, an invalidating event, such as access to data associated with the memory address by an external module, or an invalidating software instruction, is indicated, the state of the cache line is set to the invalid locked state 506, e.g. the valid bit (V) for the cache line is negated.

If, at the invalid/locked state 506, a load/store operation is received, the state of the cache line is set to the valid/locked state, e.g. the valid bit (V) for the cache line is asserted. If, at the invalid locked state 506, a software instruction unlocking the cache line is received the state of the cache line is set to the invalid/unlocked state 502, e.g. the lock bit (L) for the cache line is negated.

Figure 6:
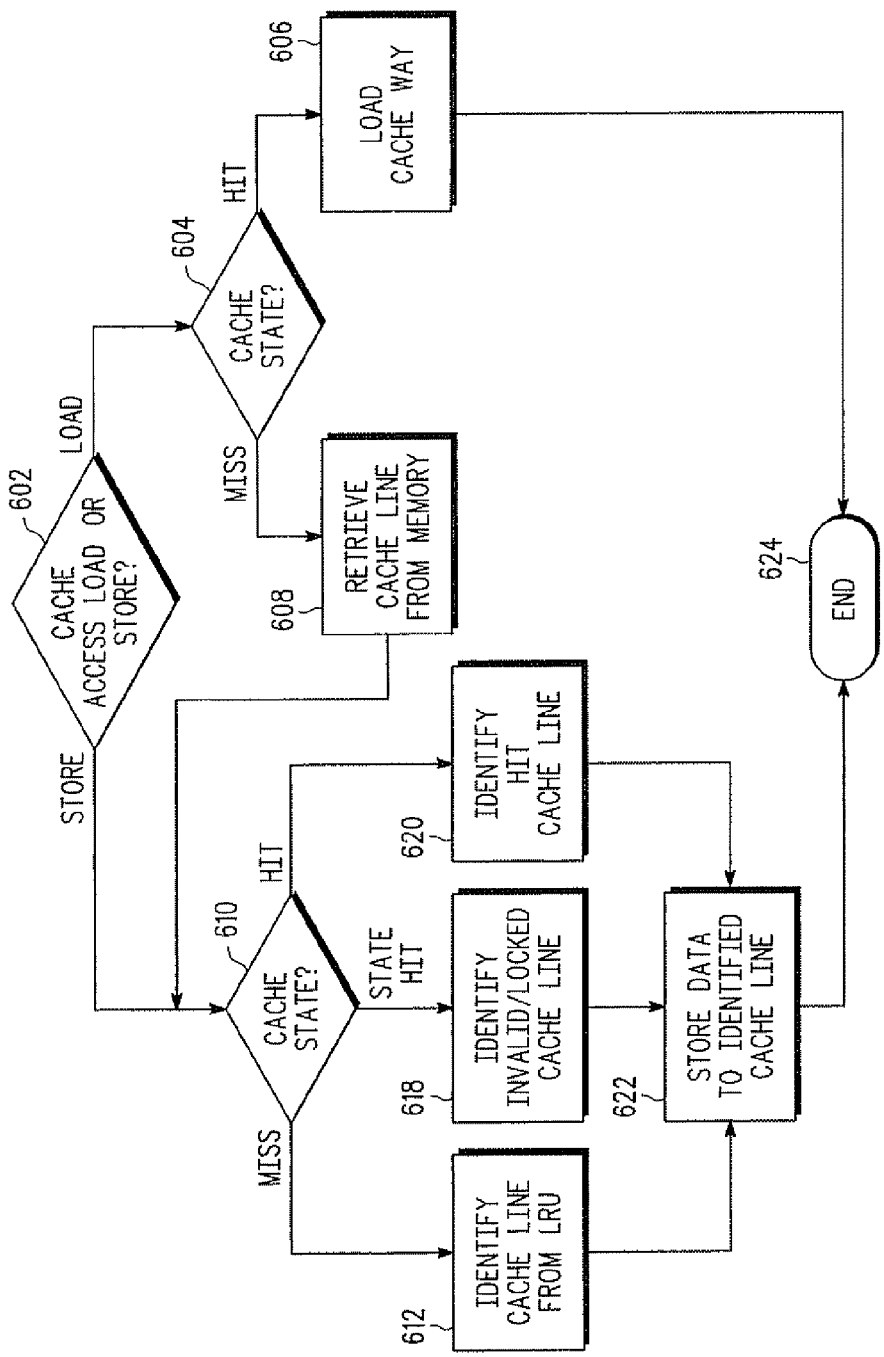
FIG. 6 is a flow diagram of a particular embodiment of a method of loading and storing data at a cache.

Referring to FIG. 6, a flow diagram of a particular embodiment of a method of processing a cache access is illustrated. At block 602, it is determined whether the cache access is a load or store operation. In the event of a load operation, the method flow moves to block 604, and it is determined whether the load operation results in a cache hit or a cache miss. In the event of a cache hit, the method flow proceeds to block 606 and the data is provided from the cache line where the cache hit occurred, and the method flow proceeds to block 624 and the illustrated method ends.

If, at block 604, a cache miss is determined, the method flow moves to block 608 and data is retrieved from memory other than the cache. Once data is retrieved, the method flow proceeds to block 610 so that the retrieved data can be stored at the cache.

Returning to block 602, if it is determined that the cache access is a store operation, the method flow moves to block 610, and it is determined whether an address associated with the store operation results in a cache hit, a cache miss, or a cache stale hit. A cache stale hit indicates that there is a locked cache line corresponding to the address associated with the store operation, but that the locked cache line stores invalid data.

In the event of a cache hit, the method flow moves to block 620 and the cache line associated with the cache hit is determined. The method flow moves to block 622 and the data associated with the stored is stored to the cache line. The method flow proceeds to block 624 and the method ends.

Returning to block 610, if the cache access results in a stale hit, the method flow moves to block 618 and the invalid/locked cache line associated with the address is determined. The method flow proceeds to block 622 where the data is stored at the cache line.

If at block 610, a cache miss is determined, the method flow moves to block 612 and a cache line is determined based on which cache line of a set is least recently used (LRU). At block 622, the data associated with the cache access is stored at the determined cache line.

Thus, the illustrated method allows the locked status of a cache line to be maintained even when the data associated with the cache line is invalid. This reduces the need for software to re-lock previously locked cache lines when the data is invalidated, thereby improving software efficiency.

In this document, relational terms such as "first" and "second", and the like, may be used solely to distinguish one entity or action from another entity or action without necessarily requiring or implying any actual such relationship or order between such entities or actions. The terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element. The term "or" are intended to cover an inclusive "or" such that if both conditions of the "or" conditional are satisfied, then the conditional is satisfied. The term "range" can include a range that includes only a single value.

The term "another", as used herein, is defined as at least a second or more. The terms "including", "having", or any variation thereof, as used herein, are defined as comprising. The term "coupled", as used herein with reference to electro-optical technology, is defined as connected, although not necessarily directly, and not necessarily mechanically.

The terms "assert" or "set" and "negate" (or "deassert" or "clear") are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

As used herein, the term "bus" is used to refer to a plurality of signals or conductors that may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time-multiplexed manner. Likewise, single conductors carrying multiple signals may be separated out into various different conductors carrying subsets of these signals. Therefore, many options exist for transferring signals.

Other embodiments, uses, and advantages of the disclosure will be apparent to those skilled in the art from consideration of the specification and practice of the disclosure disclosed herein. For example, although a store operation at a cache has been described as writing data directly to a cache line, other caches may perform a store operation by reading a cache line from the cache, modifying the cache line with the data to be stored, and writing the modified cache line to the cache. Accordingly, the specification and drawings should be considered exemplary only, and the scope of the disclosure is accordingly intended to be limited only by the following claims and equivalents thereof.

What is claimed is:

1. A method, comprising:
receiving a first indication while a cache line at a cache is in a first state that a first memory location external to the cache corresponding to the cache line is associated with an access request, the first state indicating that the cache line is valid and locked; and
in response to receiving the first indication, automatically changing the state of the cache line from the first state to a second state indicating that the data at the cache line is invalid and locked, the cache line unavailable for allocation to a second memory location when the cache line is invalid and locked.

2. The method of claim 1, further comprising in response to execution of a first instruction at a first processor, changing the state of the cache line from a third state indicating data at the cache line is valid and unlocked to the first state.

3. The method of claim 2, wherein the first indication is received in response to execution of a second instruction at a second processor.

4. The method of claim 1, wherein the first state further indicates that the data external to the cache has been modified.

5. The method of claim 1, wherein the first indication is received in response to execution of a first instruction at a first processor.

6. The method of claim 1, wherein the second state further indicates that the data is shared.

7. The method of claim 1, wherein the second state further indicates that the data has been modified.

8. The method of claim 1, further comprising automatically changing the state of the cache line from the second state back to the first state in response to execution of a second instruction at the first processor.

9. The method of claim 8, wherein the second instruction is a store instruction.

10. The method of claim 1, wherein automatically changing the state of the cache line from the first state to a the second state further comprises change the state of the cache line based on the state of a mode bit.

11. The method of claim 1, further comprising automatically changing the state of the cache line from the second state to a third state in response to execution of a first instruction at the first processor, the third state indicating the cache line is invalid and unlocked.

12. The method of claim 11, further comprising automatically changing the state of the cache line from the third state to the second state in response to execution of a second instruction at the first processor.

13. The method of claim 11, further comprising automatically changing the state of the cache line from the third state to the first state in response to execution of a second instruction at the first processor.

14. The method of claim 1, further comprising:
receiving an address associated with a store access at the cache;
receiving data associated with the store access; and
in response to determining that the cache line is in the second state and that the cache line is associated with the address, storing the data at the first cache line.

15. The method of claim 14, further comprising in response to determining that the cache does not include any cache line associated with the address, determining an available cache line and storing the data at the available cache line.

16. The method of claim 15, wherein determining an available cache line comprises determining that the cache line is not available in response to determining that the cache line is in the second state.

17. A device, comprising:
a processor;
a cache coupled to the processor, the cache comprising:
a data array configured to store a cache line;
a status module configured to store state information associated with the cache line;
an array control module coupled to the status module, the array control module configured to change the state information to a first state indicating the cache line is valid and locked in response to execution of a lock instruction at the processor, and configured to automatically change the state information to a second state from the first state, in response to receiving an indication that a first data location external to the cache and corresponding to the cache line is associated with an access request, the second state indicating that the data at the cache line is invalid and locked, the cache line unavailable for allocation to a second data location when the cache line is invalid and locked.

18. The device of claim 17, wherein the array control module is configured to automatically change the state information from the second state to the first state in response to execution of a second instruction at the processor.

19. The device of claim 17, wherein the array control module is configured to automatically change the state information from the second state to a third state indicating the cache line is invalid and unlocked in response to execution of a second instruction at the processor.

20. A method, comprising:
receiving a first indication while a cache line at a cache is in a first state that a first memory location external to the cache corresponding to the cache line is associated with an access request, the first state indicating that the cache line is valid and locked;
in response to receiving the first indication, automatically changing the state of the cache line based on a mode bit from the first state to a second state indicating that the data at the cache line is invalid and locked.

* * * * *

UNITED STATES PATENT AND TRADEMARK OFFICE
CERTIFICATE OF CORRECTION

PATENT NO. : 7,827,360 B2
APPLICATION NO. : 11/832797
DATED : November 2, 2010
INVENTOR(S) : Syed R. Rahman et al.

Page 1 of 1

It is certified that error appears in the above-identified patent and that said Letters Patent is hereby corrected as shown below:

Column 11, Lines 20-21, please change "the first state to a the second state" to --the first state to the second state--

Signed and Sealed this
Eighteenth Day of October, 2011

David J. Kappos
*Director of the United States Patent and Trademark Office*